(12) United States Patent
Blanford et al.

(10) Patent No.: US 6,561,426 B1
(45) Date of Patent: *May 13, 2003

(54) METHODS AND APPARATUS FOR SUPPLEMENTAL BARCODE DETECTION AND DECODING

(75) Inventors: Denis Michael Blanford, Duluth, GA (US); Daniel Byron Seevers, Duluth, GA (US); Robert Joseph Tom, Gainesville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/690,612

(22) Filed: Oct. 17, 2000

Related U.S. Application Data

(63) Continuation of application No. 09/257,461, filed on Feb. 25, 1999, now Pat. No. 6,158,660.

(51) Int. Cl.$^7$ .................................................. G06K 7/10
(52) U.S. Cl. ........................ 235/462.02; 235/462.08
(58) Field of Search .................. 235/462.11, 462.25, 235/462.07, 462.08, 462.18, 375, 385, 462.02

(56) References Cited

U.S. PATENT DOCUMENTS

| | | | |
|---|---|---|---|
| 3,673,389 A | 6/1972 | Kapsambelis et al. ... | 235/61.11 R |
| 3,959,624 A | 5/1976 | Kaslow ................ | 235/61.11 E |
| 4,114,033 A | 9/1978 | Okamoto et al. ........... | 235/494 |
| 4,147,295 A * | 4/1979 | Nojiri et al. | |
| 4,540,880 A * | 9/1985 | Hipko ........................ | 235/487 |
| 4,839,507 A | 6/1989 | May ........................... | 235/381 |
| 4,908,761 A * | 3/1990 | Tai .............................. | 705/14 |
| 5,128,520 A | 7/1992 | Rando et al. ............... | 235/375 |
| 5,128,527 A | 7/1992 | Kawai et al. ............... | 235/462 |
| 5,198,649 A | 3/1993 | Brooks ....................... | 235/462 |
| 5,262,623 A | 11/1993 | Batterman et al. .......... | 235/454 |
| 5,288,976 A | 2/1994 | Citron et al. ............... | 235/375 |
| 5,304,787 A * | 4/1994 | Wang | |
| 5,317,139 A | 5/1994 | Evans et al. ................ | 235/462 |
| 5,336,874 A | 8/1994 | Hasegawa ................... | 235/466 |
| RE35,117 E | 12/1995 | Rando et al. ............... | 235/375 |
| 5,686,715 A | 11/1997 | Watanabe et al. .......... | 235/436 |
| 5,691,773 A * | 11/1997 | Wang | |
| 5,783,811 A * | 7/1998 | Feng et al. | |
| 6,158,660 A * | 12/2000 | Blanford et al. | |

FOREIGN PATENT DOCUMENTS

| | | | | |
|---|---|---|---|---|
| JP | 06091950 A | * | 4/1994 | ............. B41J/5/30 |
| JP | 06-243303 | * | 9/1994 | |
| JP | 07-141458 | * | 6/1995 | |
| JP | 09-226930 | * | 9/1997 | |
| JP | 10-117097 | * | 5/1998 | |

* cited by examiner

*Primary Examiner*—Diane I. Lee
(74) *Attorney, Agent, or Firm*—Priest & Goldstein, PLLC; Paul W. Martin

(57) ABSTRACT

A system for detecting and decoding a supplemental barcode accompanying a primary barcode. A supplemental barcode is affixed to a product in the vicinity of a primary barcode. A scanner in a barcode reading system, such as a point of sale system, scans for a primary barcode. Upon detection of a primary barcode, the system inserts a delay while attempting to detect a supplemental barcode. Upon detection of a secondary barcode, the primary and supplemental barcode information is processed, for example by sending the information to a terminal connected to the scanner. Upon expiration of the delay without detection of a supplemental barcode, the primary barcode information is processed.

2 Claims, 3 Drawing Sheets

METHODS AND APPARATUS FOR SUPPLEMENTAL BARCODE DETECTION AND DECODING

This application is a continuation of application Ser. No. 09/257,461 filed Feb. 25, 1999, now U.S. Pat. No. 6,158,660.

FIELD OF THE INVENTION

The present invention relates generally to improvements to barcode labeling and reading. More particularly, the invention relates to methods and apparatus for encoding and reading supplemental information in the form of a supplemental barcode which is advantageously read in conjunction with a primary barcode.

BACKGROUND OF THE INVENTION

Barcodes are widely used to provide fast and convenient identification of an item. Affixing a barcode to an item provides a machine-readable label which can contain either direct information about the item or serve as an index to a stored catalog or directory of items, which may contain as much information about each item as is desired. The use of barcodes is particularly prevalent in retailing. A specific brand or model of an item can be uniquely identified using a bar-coded identification number, with the identification number being quickly and easily read at the time of a transaction. Because the specific class of item can be identified, it is not necessary to place pricing information on the item. Instead, pricing information can be stored in a central computer, making it easy to change pricing for a particular brand or model without individually marking each item. Moreover, the identifying information contained in a barcode makes it easy to maintain records of inventory and to track and store sales information for an item.

It is often desirable to include supplemental information about particular items in a class of items, which are distinguished in some way from the class as a whole. In retailing, for example, it is often desirable, particularly in connection with perishable foods, to discount an individual item without discounting all other items of the same brand and type. For example, if a perishable item is approaching or has passed the end of its shelf life, it may be desired to discount the price of the item to encourage its immediate purchase. In barcode scanning systems of the prior art, this can be accomplished through manual intervention on the part of the operator. This requires that the operator recognize the item as one which has been marked down, typically through a human-readable label prominently affixed to the item. The operator must also know the markdown price and manually enter it, or must manually activate a markdown function on the scanner which will indicate to the central computer that the individual item has been marked down and instruct the computer to retrieve and apply the new markdown price. This is a labor-intensive operation, requiring that each item to be marked down be individually relabeled, and that the operator of the scanner intervene manually with each marked-down item. The operation is therefore costly and is subject to human error.

Alternatively, for each item of a particular type which is to be marked down, a new barcode label may be printed and affixed over the old barcode label. A single label for all product types, simply indicating that the item has been marked down, is insufficient, as the central computer will be instructed that the item has been marked down, but will not be informed of the identity of the item. The new barcode label should therefore contain information identifying the product type as well as an indication that the item has been marked down. This requires a different label for every product type, as well as the labor to affix a label to each item to be marked down. Moreover, in retailing such a barcode is nonstandard, as a standardized system of retail barcode labels exists, each identifying a specific item class, such as a particular brand and size of item. The use of a nonstandard barcode would give up the convenience of using the standard barcode, and would introduce increased complexity into the system, as the system would need to be adapted to accommodate the specialized barcodes used to contain both the primary and the supplemental information.

SUMMARY OF THE INVENTION

The present invention recognizes a need for a system in which a supplemental barcode label can be used to supplement a presently existing primary barcode label, with the presently existing label providing, for example, information about product identity, and the supplemental label providing supplemental information, for example, as an indication that the item has been marked down.

A scanning system according to one aspect of the present invention includes a scanner for reading a barcode label, preferably programmable to operate in a normal mode and in a supplemental label mode. In the normal mode, the scanner operates to read and operate on primary barcode information such as a Universal Product Code (UPC) label, as is commonly known in the art. In the supplemental label mode, the scanner first seeks a primary barcode label, such as a UPC label placed on a product. After a successful read of the primary label, the scanner seeks a supplemental label such as a special markdown label placed in the vicinity of the product identification label and preferably placed so as to partially obscure the primary label. If a supplemental label is detected, the transaction is conducted in accordance with the additional information contained in the supplemental label, for example pricing a product at a special markdown price rather than the regular price for the product. If the supplemental label is not immediately detected by the scanner, a delay is preferably inserted before the following read in order to give the scanner time to look for the supplemental label. The scanner may also advantageously be provided with an operator-initiated supplemental label function. With such a function, the operator presses a special supplemental label key upon visual detection of a supplemental label, instructing the scanner to wait until a primary label and a supplemental label are detected before sending data to the terminal.

A more complete understanding of the present invention, as well as further features and advantages of the invention, will be apparent from the following Detailed Description and the accompanying drawings.

DETAILED DESCRIPTION

Figure 1:
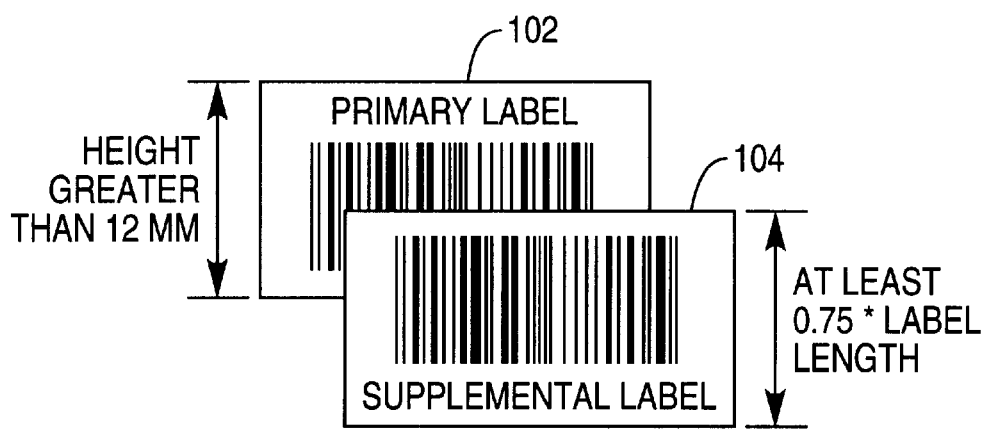
FIG. 1 illustrates a primary and supplemental label combination according to the present invention and suitable for use with a scanner according to the present invention.

FIG. 1 illustrates a primary label 102 and a supplemental label 104 according to the present invention. The primary label 102 is preferably a conventional EAN/JAN/UPC label which may be used with or without a supplemental label such as the supplemental label 104 being present. Because the primary label 102 is suitable for use with or without a supplemental label, the primary label contains no indication of whether or not a supplemental label is present. The supplemental label 104 is preferably positioned so as to partially obscure the primary label 102, rendering the primary label 102 more difficult to read. While the supplemental label 104 should be positioned so as to partially obscure the primary label 102, the aspect ratio (label height divided by label length) of the primary label 102 should not be truncated or reduced by more than a factor of two. The minimum height of the primary label 102 should be more than 12 mm. The supplemental label 104 should preferably be a Code 128 label as defined in the General EAN specification manual. The magnification factor of the supplemental label 104 should be no less than 0.8 magnification. The aspect ratio of the supplemental label (label height divided by label length) should be greater than 0.75. For example, if the supplemental label 104 is 1.6 inches long, its height should be no less than 1.2 inches.

Figure 2:
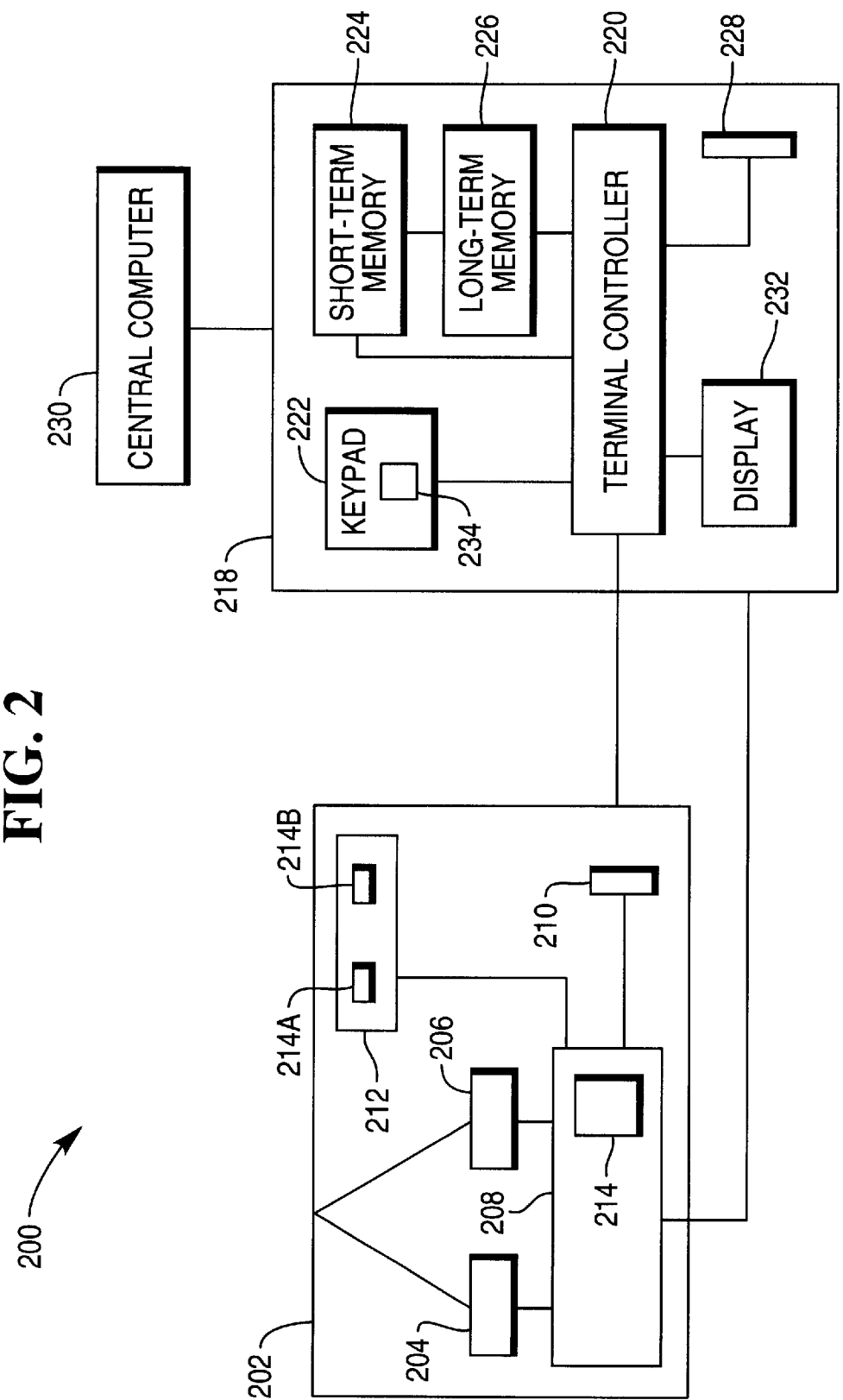
FIG. 2 illustrates a point of sale system using a scanner providing a supplemental label operation according to the present invention.

FIG. 2 illustrates a point of sale system 200 including a scanner 202 according to the present invention. The scanner 202 is adapted to detect and read a primary label such as the primary label 102 of FIG. 1, and to detect and register a supplemental label such as the supplemental label 104 of FIG. 1, if one is present. The scanner 202 includes a laser 204 for illuminating a barcode, a video receiver assembly 206, and a controller 208. The scanner 202 includes a loudspeaker 210 for providing an audible tone or indication to an operator and a visual display, illustrated here as a bicolor indicator 212 having a red light-emitting diode (LED) 214A and a green LED 214B. The controller 208 includes memory 216 for storing barcode information while waiting to transmit the information to a point of sale terminal 218, which is connected to the scanner 202. The memory 216 is also used to store programming information for use by the controller 208 in directing the operation of the scanner 202.

The terminal 218 includes a terminal controller 220 for directing the operation of the terminal 218 and controlling communications with the scanner 202. The terminal 218 also includes a keypad 222, connected to the terminal controller 220, for use by an operator in directing the operation of the terminal 218. The terminal 218 also includes short-term memory 224 for storing barcode information received from the scanner 202 and for use in operation of the terminal 218 and communication between the terminal 218 and the scanner 202. The terminal 218 includes long-term memory 226 for storing transaction results and other information which may be desired to be retained by the terminal for relatively extended periods. The terminal 218 also includes a terminal loudspeaker 228 for providing audible feedback to the operator. The terminal 218 also preferably communicates with a central computer 230, which stores pricing information, such as price lookup (PLU) file, and other information used by the terminal 218 in sales transactions, and which receives transaction results from the terminal 218. The terminal 218 may communicate continuously with the computer 230, or alternatively may operate in a stand-alone fashion most of the time, and periodically exchanging information with the central computer 230.

When an item is passed over the laser 204, light from the laser 204 is directed to the item and reflected. Some of the reflected light is captured by the video receiver assembly 206, and the reflected light is analyzed by the video receiver assembly 206 to detect the presence, and determine the content, of one or more barcodes. When a good read occurs, the point of sale system 200 provides an audible signal, typically referred to as a good read tone, to the operator. Depending on design and programming, the audible signal may be provided by either the scanner 202 or the terminal 218. A visual signal is also provided by either the bi-color display 214 or a terminal display 232. If the scanner 202 is to be the source of the good read tone, the scanner loudspeaker 210 emits the good read tone when a label, such as an EAN/JAN/UPC label, is detected by the scanner 202 and successfully read or captured. If the terminal 218 is to be the source of the good read tone, the terminal loudspeaker 228 emits the tone when the captured barcode information is transferred from the scanner 202 to the terminal 218.

The scanner 202 can preferably be set to operate in either a conventional mode or a supplemental mode. If the scanner 202 is set to the conventional mode, barcode information is simply sent to the terminal 218 as each barcode is scanned. In the supplemental mode, the scanner 202 first looks for a primary label. The controller 208 examines the data from the video receiver assembly 206 to determine the presence of a primary label. When a primary label is detected, the controller 208 buffers the data represented by the primary label and initiates a delay period while it further examines the data for the presence of a supplemental label. Upon detection of a supplemental label, the scanner 202 sends the data from both labels to the terminal 218, preferably sending the supplemental data followed by the primary data. If no supplemental label is detected by the expiration of the delay period, the scanner 202 sends the data from the UPC label to the terminal 218. The terminal 218 looks up the primary label information to identify the item it represents, and fetches the price of the item. The terminal 218 then looks up the information represented by the supplemental label and uses the information in a predetermined way.

For example, the terminal 218 may reduce the price of the item by an amount associated with the supplemental label. The supplemental label may be a unique label representing a particular markdown amount, in which case the markdown amount is indexed according to the label. Alternatively, the supplemental label may simply indicate that the item has been marked down. In that case, each item will have an associated regular price and an associated markdown price. Upon detection of a supplemental label indicating a markdown, in conjunction with a primary label representing a particular item, the terminal 218 will use the markdown price associated with that item, rather than the regular price. Instead of indicating simply a marked down price, the supplemental label may alternatively indicate, for example, the shelf the item comes from or the particular salesperson who sold the item. This information can be stored instead of, or in addition to, any markdown amount. A supplemental label is read in the same way no matter what information it contains. The point of sale system will retrieve and use the supplemental information according to predetermined instructions.

The point of sale system 200 provides auditory and visual feedback to the operator to indicate when a good read occurs. This feedback differs according to whether the scanner 202 or the terminal 218 is to be the source of a good read tone. The choice affects throughput through the point of sale system 200. If the scanner 202 is chosen as the source of the good read tone, the scanner loudspeaker 210 typically gives an auditory signal as soon as a primary label is detected. This signals the operator to bring another item into the visual field of the scanner 202. As noted above, however, the scanner 202 initiates a delay period upon detection of the primary label. The next item is not read by the scanner 202 until either the delay period expires or a supplemental label is detected. When a supplemental label is detected the primary and supplemental data are sent to the terminal 218 and the scanner loudspeaker 210 sounds a supplemental label tone, preferably different in frequency from the good read tone. The scanner 202 is then able to process the next item, which was brought into the visual field of the scanner 202 when the operator was alerted by the good read tone produced after the reading of the primary label.

If the terminal 218 is the source of a good read tone, the terminal 218 does not sound the good read tone until after receiving the successfully read barcode data. For items with no supplemental label, this occurs after the expiration of the timeout period. At the reception of the barcode data the terminal loudspeaker 228 sounds a good read tone for each label read. This includes a good read tone for the primary label and, if a supplemental label is present, a supplemental label tone for the supplemental label. Throughput is diminished because for items with no supplemental label, the good read tone will not sound until after the expiration of the timeout period.

In order to provide for a lower degradation of throughput, the point of sale system 200 preferably provides for an operator-initiated supplemental label function. The keypad 222 includes a special supplemental label key 234, which the operator may press to issue a supplemental label command to place the point of sale system 200 into supplemental label mode for the next read only as needed. The point of sale system 200 is operated in the normal mode, except that when the operator sees a supplemental label, the operator presses the supplemental label key 234 on the keypad 222, placing the system 200 in supplemental label mode for the next read only. The system 200 will only insert a delay, therefore, on reads specifically designated as reads to be executed in supplemental mode. Moreover, since these reads will be of items visually confirmed to include a supplemental label, it is likely that in most cases the entire timeout period will not have to elapse before the read is completed. The use of the supplemental label command allows the operator to avoid a timeout after each read, and thereby to increase system throughput, at a small cost in operator intervention.

It is also possible to program the scanner 202 to register an 'early' good read. If this feature is activated, the delay mentioned above is only inserted when evidence of a supplemental label is detected during a scan of an item. If an item is scanned, the scanner 202 registers a good read as soon as a primary label is detected with no evidence of an accompanying supplemental label.

Figure 3:
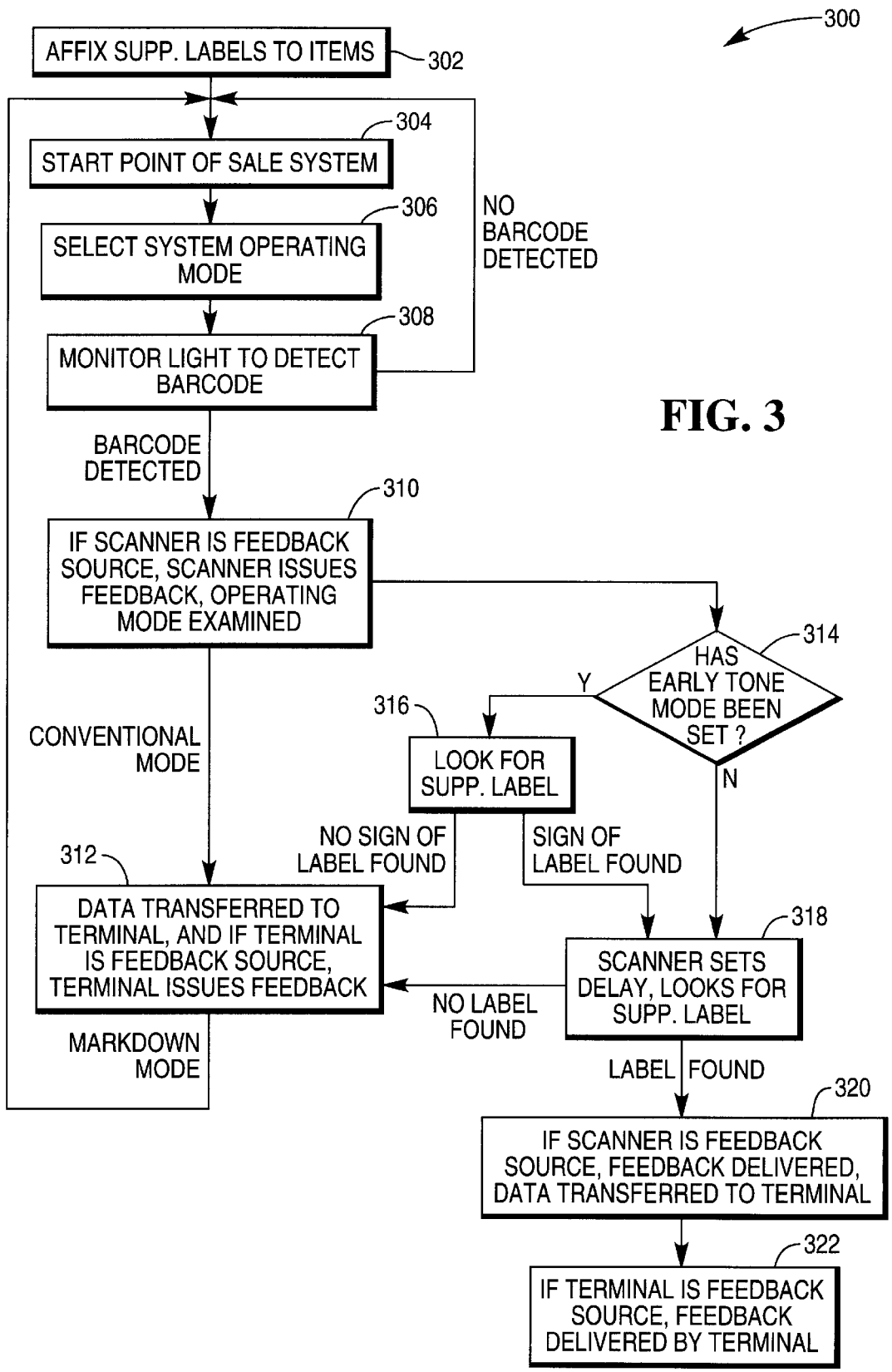
FIG. 3 illustrates the steps of a method for providing and detecting a supplemental label according to the present invention.

FIG. 3 illustrates a method 300 of supplemental label barcoding and barcode reading according to the present invention. At step 302, supplemental labels such as the supplemental label of FIG. 1 are placed on a plurality of items meeting predetermined criteria, such as items which are nearing the end of their shelf life. At step 304, a point of sale system such as the system 200 of FIG. 2, having a supplemental label feature, is started, and at step 306, the mode of operation of the system is selected. The point of sale system may be operated in a conventional mode or a supplemental label mode. If the system is operated in a conventional mode, an operator-entered supplemental label command may be issued before a specific scan, placing the system into the supplemental label mode for the next scan. At step 308, light entering a video receiver circuit is monitored to determine if a primary label has been detected. If a primary label has been detected, control is passed to step 310. If no label has been detected, step 306 is repeated.

At step 310, if the scanner is to be the source of a good read indication, such an indication is provided, preferably through an audible signal. Next, the mode of operation of the point of sale system is examined. If the system is in the conventional mode and no supplemental label command has been entered, control is passed to step 312. If the system is in the supplemental label mode, control is passed to step 314.

At step 312, the barcode data is transferred to a terminal which is part of the point of sale system. If the operator notification of a good read is to come from the terminal, the terminal provides operator feedback at this point, preferably through an audible signal. The barcode information is processed and control is returned to step 306, to allow the operator to select the mode of operation before the next scan. Mode selection typically does not involve active intervention by the operator, who selects the mode by either entering a supplemental label command, deliberately setting the mode to the conventional or supplemental label mode, or simply allowing the system to remain in the same mode.

At step 314, settings are examined to see if an early tone mode has been set. If yes, control is passed to step 316 and the scanner looks for a sign of a supplemental label. If no sign is found, control is passed to step 312. If a sign of a supplemental label has been found, control is passed to step 318. If no early tone mode has been set, control is passed to step 318.

At step 318, the scanner sets a predetermined delay and looks for a supplemental label. If a supplemental label is found, control passes to step 320. If no supplemental label is found and the timer expires, control is passed to step 312.

At step 320, if the scanner is to be the source of the supplemental label indication, feedback is provided, preferably in a tone of a different frequency than the good read tone. Next, the UPC information and the supplemental label information are transferred to the terminal and control is passed to step 322 If the terminal is to be the source of the good read tone, the terminal provides a good read tone and then a supplemental label tone.

While the present invention is disclosed in the context of a presently preferred embodiment, it will be recognized that a wide variety of implementations may be employed by persons of ordinary skill in the art consistent with the above discussion and the claims which follow below.

We claim:

1. A method of label processing comprising the steps of:
    attached a supplemental barcode label to a merchandise item having a primary barcode label;
    wherein the supplemental barcode label partially obscures the primary barcode label;
    performing a scan to attempt to detect one or both of the primary barcode label and the secondary barcode label;
    analyzing the scan;
    upon detection of the primary barcode label, attempting to detect the secondary barcode label; and
    processing the primary barcode label and the secondary barcode label upon detection of the secondary barcode label.

2. A label processing system comprising:
    means for detecting a primary barcode label affixed to an item offered for sale;
    means for initiating a predetermined delay period after detecting the primary barcode label;
    means for attempting to detect a supplemental barcode label during the predetermined delay period, the supplemental barcode label affixed to the item offered for sale;
    wherein the supplemental barcode label partially obscures the primary barcode label;
    means for recovering data associated with only the primary barcode label, if the supplemental barcode label is not detected during the predetermined delay period; and
    means for recovering data associated with both the primary barcode label and the supplemental barcode label, if the supplemental barcode label is detected during the predetermined delay period.

* * * * *